Figure 8:
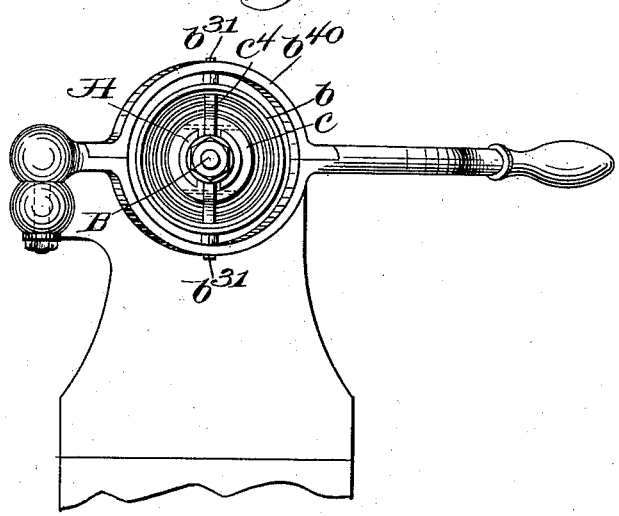

No. 662,470. Patented Nov. 27, 1900.
W. SCOTT.
CHUCK.
(Application filed Mar. 15, 1900.)
(No Model.) 4 Sheets—Sheet 1.
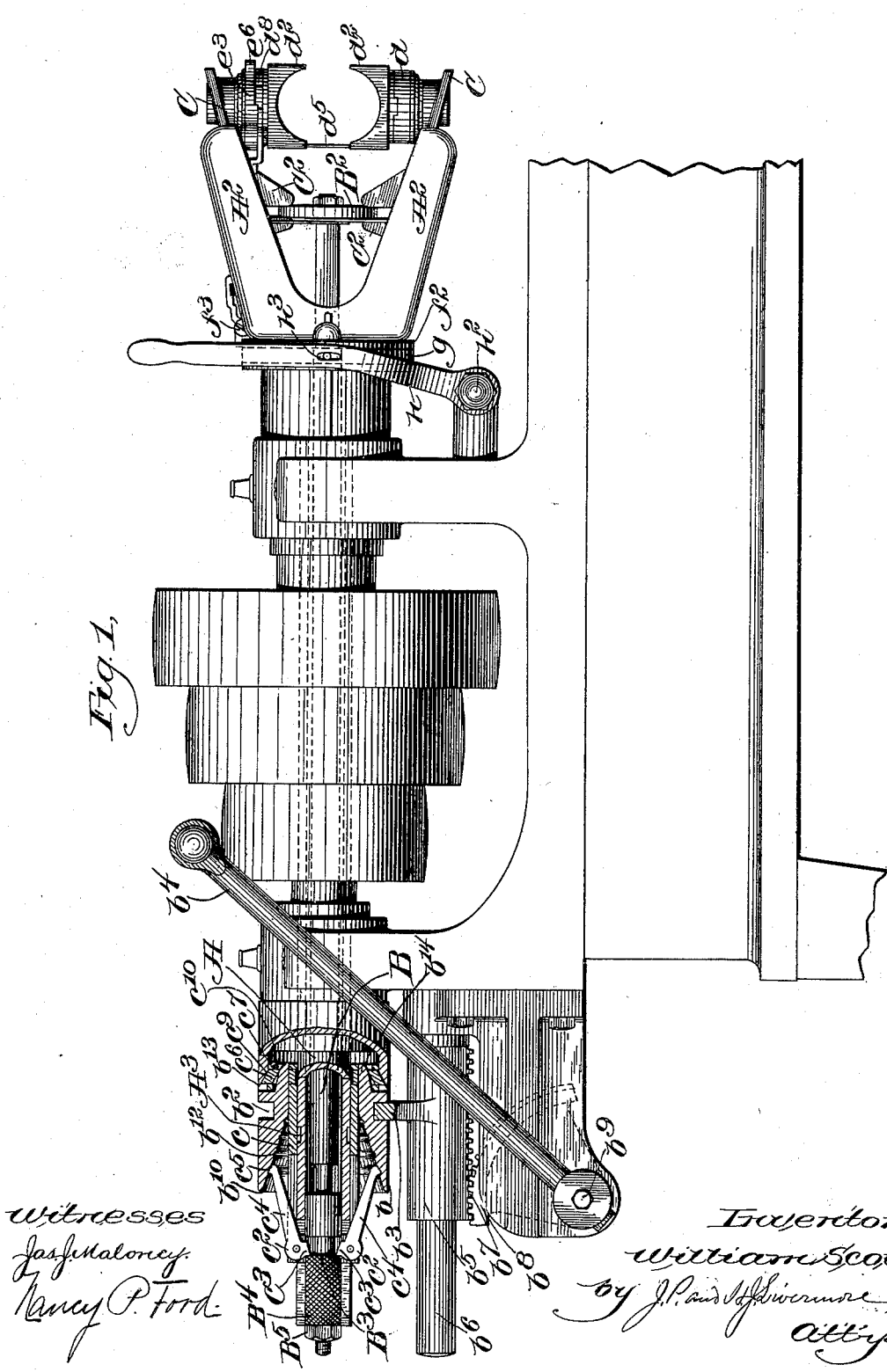

No. 662,470. Patented Nov. 27, 1900.
W. SCOTT.
CHUCK.
(Application filed Mar. 15, 1900.)
(No Model.) 4 Sheets—Sheet 2.
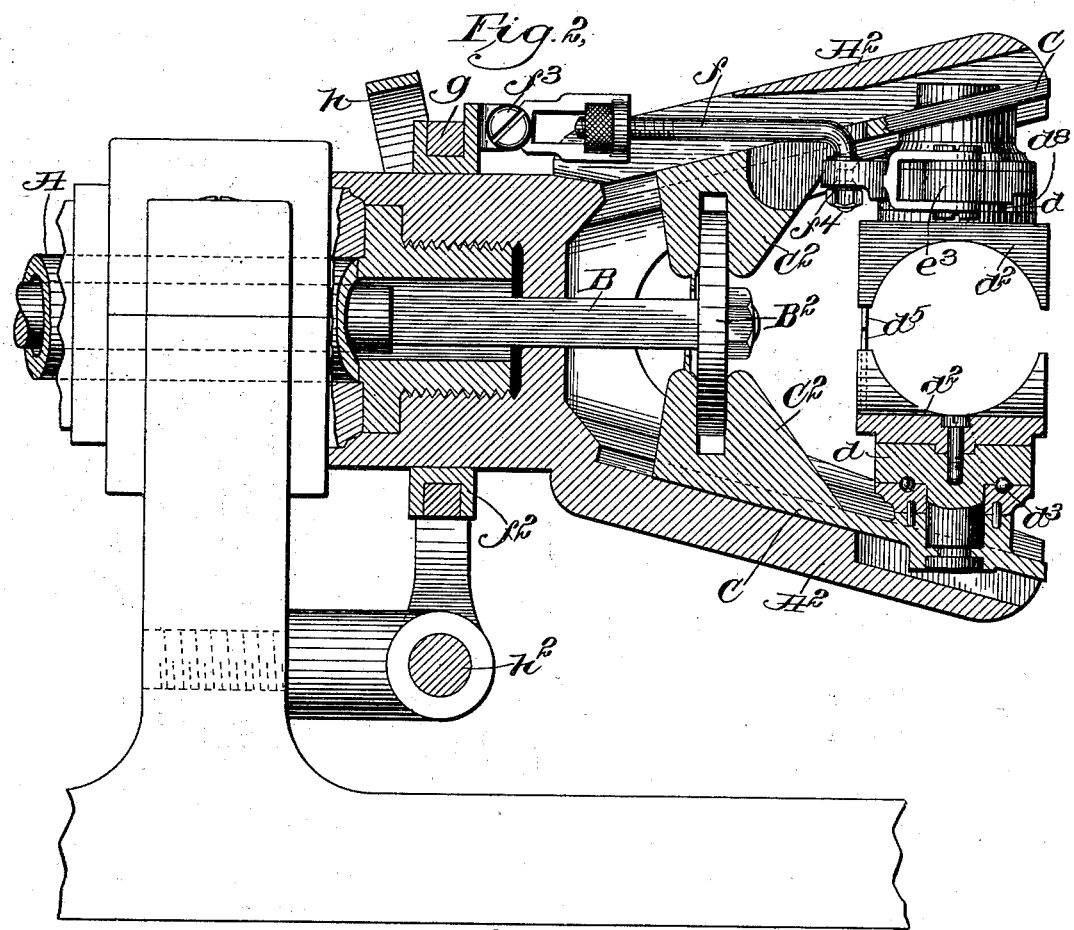
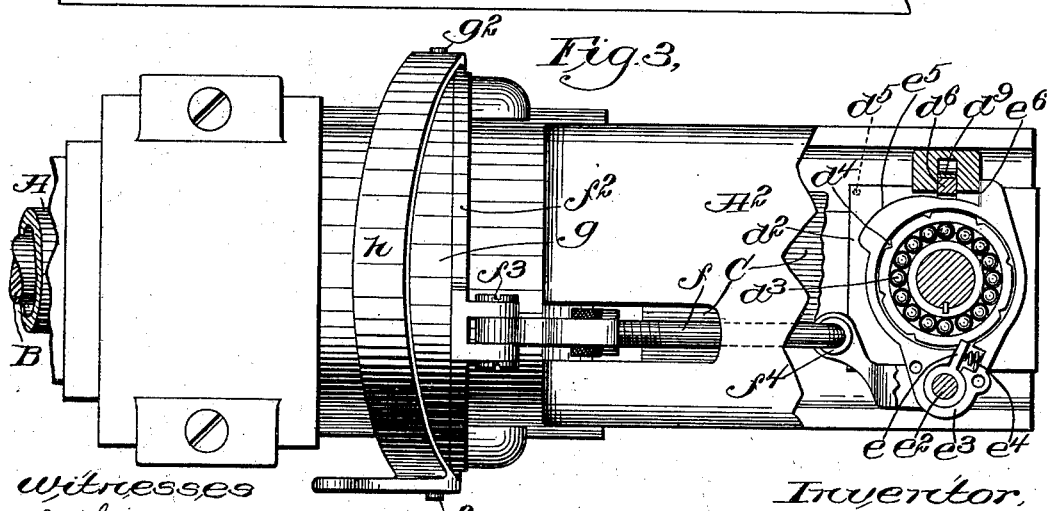
Witnesses
Jas. J. Maloney.
Nancy P. Ford.
Inventor,
William Scott.
by J. P. and H. J. Livermore
Att'ys.

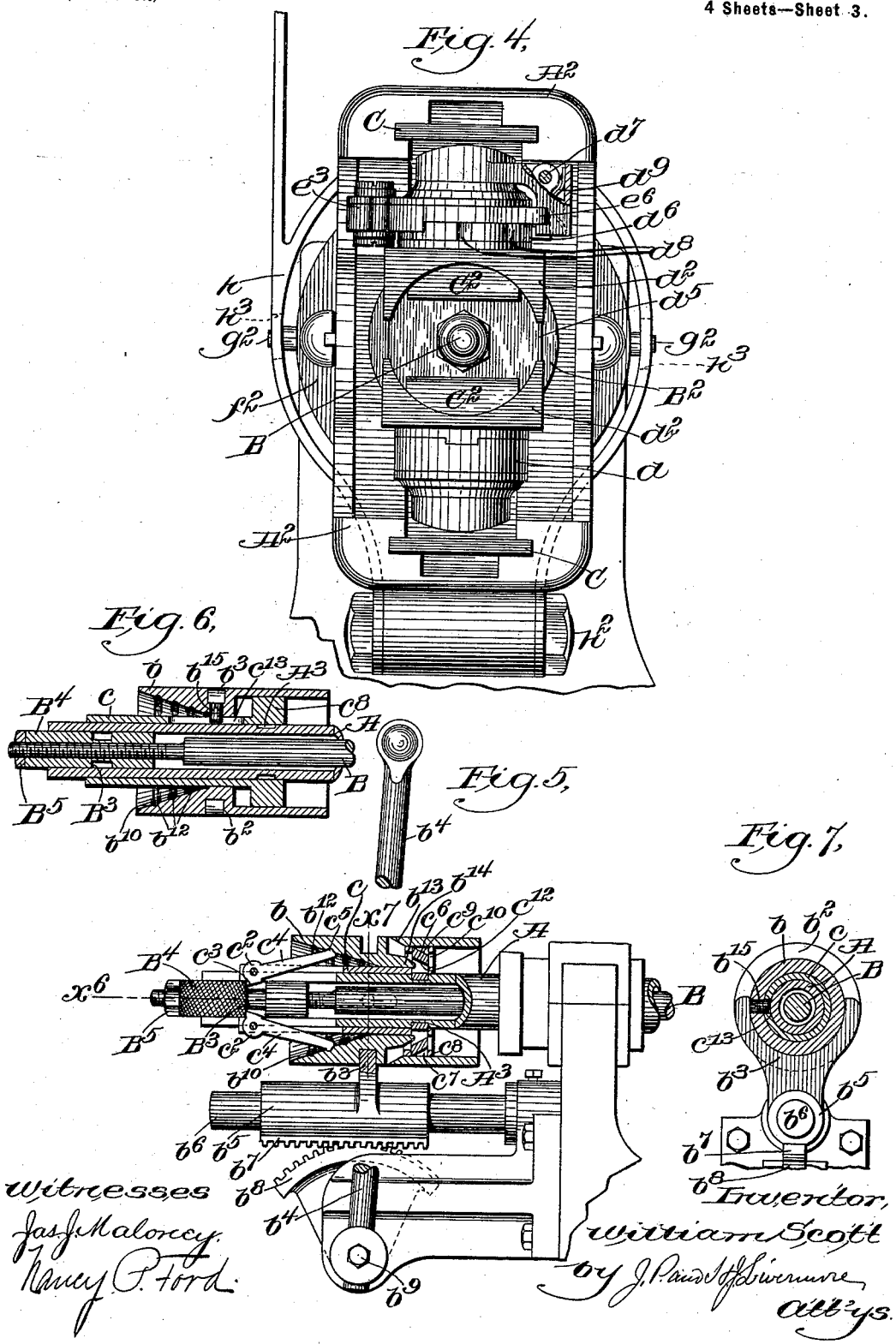

No. 662,470. Patented Nov. 27, 1900.
W. SCOTT.
CHUCK.
(Application filed Mar. 15, 1900.)

(No Model.) 4 Sheets—Sheet 4.

Witnesses: Inventor,
Jas. F. Maloncy. William Scott
Nancy P. Ford. by J. P. and N. H. Livermore
Att'ys.

THE NORRIS PETERS CO., PHOTO-LITHO., WASHINGTON, D. C.

UNITED STATES PATENT OFFICE.

WILLIAM SCOTT, OF MEDFORD, MASSACHUSETTS.

CHUCK.

SPECIFICATION forming part of Letters Patent No. 662,470, dated November 27, 1900.

Application filed March 15, 1900. Serial No. 8,828. (No model.)

*To all whom it may concern:*

Be it known that I, WILLIAM SCOTT, of Medford, county of Middlesex, and State of Massachusetts, have invented an Improvement in Chucks, of which the following description, in connection with the accompanying drawings, is a specification, like letters on the drawings representing like parts.

The present invention relates to a chuck for lathes and the like, and is mainly intended for use with so-called "turret-lathes," in which castings or other articles are finished by the successive operations of several tools thereon.

It is one object of the invention to so arrange the chuck that the castings can be readily inserted without the use of a wrench or special tool, thereby saving time; and a further object of the invention is to so arrange the chuck-jaws that they can be rotated without stopping the lathe when articles having more than one part to be finished are being operated upon, which renders it necessary to turn the jaws to successively present the different parts to the tools or in the absence of rotatable jaws to take out the article and replace it in a new position.

The chuck embodying the invention is provided with movable and stationary members having inclined engaging surfaces, the jaws being opened or closed by the movement of one of said members with relation to the other.

As herein shown, the main lathe-shaft is in the form of a sleeve or tube and constitutes the stationary chuck member, while the movable chuck member, which is shown as carrying the jaws, consists of a rod concentric with said tube and longitudinally movable with relation thereto. The said rod is provided in accordance with the present invention with novel actuating, locking, and adjusting devices, whereby the articles are firmly clamped in the chuck by a single movement of an actuating device, there being a device for preliminary adjustment to adapt the chuck for articles of different sizes and means whereby slight variations in size are automatically taken care of when the chuck is operated.

In accordance with the invention the movable chuck member is provided with main and supplemental actuating devices, the main actuating device being directly connected with an actuating-handle under the control of the operator and the supplemental actuating device being provided with a fastening device to lock it to the stationary chuck member after it has been moved a predetermined distance, the said main and supplemental devices being so connected that they coöperate in affording a variable locking device to lock the secondary actuating device to the movable chuck member, so that after said secondary actuating device is locked to the stationary chuck member a further movement of the movable chuck member relative to said parts may take place before the chuck is finally set. Thus while in the initial operation of the chuck the said main and supplemental devices will travel together the construction is such that as soon as the chuck-jaws bind and afford resistance to the further movement of the movable chuck member the continued pressure upon the main actuating device will cause the same to move relatively to the supplemental actuating device, which at about this time is automatically locked to the stationary chuck member, the said parts being so arranged, however, that the resistance to the closing of the jaws will tend to lock the said actuating members firmly together and to the movable chuck member, so that the several parts can only be separated and the chuck opened by a movement of the actuating member through its actuating-handle. The fastening device whereby the supplemental actuating device is locked to the stationary chuck member is arranged to operate when said device has reached such a position that the article in the lathe is held in the chuck, but not fully clamped, the locking and unlocking of said supplemental device depending upon the independent movement of the main actuating device when the movement of the movable chuck member is resisted. The said devices are further so arranged that as the main actuating device moves independently of the supplemental actuating device a slight but powerful movement of the movable chuck member will be produced, thus compensating for slight differences in the sizes of the articles to be retained in the chuck and causing each article to be firmly held. The chuck is also provided with adjusting means whereby the locking position of the supplemental actuating device may be initially varied to afford a preliminary adjustment of the chuck for articles of different sizes.

The chuck is provided in accordance with the invention with rotatable jaws adapted to receive the articles which are to be operated upon, the said jaws having an actuating device which is rotatable with the chuck, but adapted to be acted upon by a non-rotatable actuating member secured to the frame of the lathe, so that when one portion of a coupling has been finished the jaws can be rotated to present another portion without stopping the lathe, thus saving much valuable time in the operation. This may be accomplished, as herein shown, by providing the jaws with ratchet-teeth adapted to be acted upon by a pawl connected with a sleeve longitudinally movable on the shaft and rotatable therewith, the said sleeve being acted upon by an actuating device which is stationary with relation thereto so far as relates to rotary movement, so that the movement of said actuating device will be transmitted to the pawl regardless of the position in which the shaft may be.

By means of the ratchet movement the jaws can be rotated step by step and locked at each of a number of predetermined positions, so that by working the actuator the proper number of times the jaws will be brought to the proper position without the exercise of judgment on the part of the operator, and the casting which is being operated upon will always be properly presented to the tool.

Figure 1 is a side elevation, partly in section, of the chuck embodying the invention, sufficient of the lathe-frame being shown to properly illustrate the action of the chuck. Fig. 2 is a longitudinal section, on an enlarged scale, of the chuck proper, showing the mechanism for rotating the jaws. Fig. 3 is a plan view, partly in section, of the same part of the device on the same scale; Fig. 4, a front elevation of the chuck on the same scale as Figs. 2 and 3; Fig. 5, a detail on the same scale as Fig. 1, showing the chuck-actuating mechanism in a different position from that shown in Fig. 1; Fig. 6, a horizontal section on the line $x^6$ of Fig. 5; Fig. 7, a transverse section on the line $x^7$ of Fig. 5, and Figs. 8 and 9 details showing a modification of the chuck-actuating device.

The chuck proper comprises the members A and B, longitudinally movable with relation to each other, but both adapted to rotate in the operation of the lathe, the member A being shown as the shaft of the lathe, which is hollow or tubular to contain the member B, which is longitudinally movable with relation thereto. The said member A has secured to the end thereof a block or frame provided with the inclined guides $A^2$ to receive the revolving chuck-jaw carriers C, which are connected with the member B, so that the longitudinal movement thereof will cause them to travel along the inclined guides and be drawn together or separated according to the direction of movement. The said jaw-carriers C are shown as provided with slotted lugs $C^2$ to receive a disk $B^2$ at the end of the member B, whereby the movement of said member B is transmitted to said jaw-carriers.

Referring to Fig. 1, the chuck is initially operated by what may be termed the "main actuating device" $b$, shown as a sleeve provided with a transverse groove $b^2$, adapted to receive a yoke or collar $b^3$, Figs. 1, 5, 6, and 7, which is arranged to be acted upon by a lever or handle $b^4$, the said yoke being shown in Fig. 1 as mounted on a slide member $b^5$, having a guide support or bearing $b^6$ and rack-teeth $b^7$, which mesh with a segmental gear $b^8$, carried by the handle $b^4$, which is pivotally connected with the lathe-frame at $b^9$. By throwing the handle $b^4$ from the position shown in Fig. 1 to the position shown in Fig. 5 the said sleeve $b$ is moved longitudinally with relation to the lathe-frame and in such movement is adapted to close the chuck through movement transmitted to the member B.

In order that the chuck-jaws may be locked independently of the actuating-handle $b^4$ and also that castings slightly differing in size may be firmly held without preliminary adjustment, the main actuating device $b$ instead of being directly connected with the movable chuck member B is connected therewith through a supplemental actuating device $c$ and coöperates therewith in affording variable locking means, whereby said supplemental actuating device is finally locked to the said movable chuck member, the said supplemental actuating device being arranged to be previously locked to the stationary chuck member at the end of a predetermined movement, after which a movement of the main actuating device relative to the supplemental actuating device may take place and result in a short but powerful additional movement of the movable chuck member before said movable chuck member is finally locked. As herein shown, the said supplemental actuating device is embodied in a sleeve $c$, interposed between the sleeve $b$ and the stationary chuck member A, the movement of the sleeve $b$ being transmitted to the sleeve $c$ and to the movable chuck member B through the agency of a compensating device which coöperates with the several parts in such a way as to resist the movement of the movable chuck member, but to yield to a movement of the main actuating device, the parts all being locked together by pressure at the chuck-jaws when the chuck is closed, but capable of being unlocked in response to a movement of the main actuating device. As herein shown, the said compensating device is embodied in one or more levers $c^2$, pivotally supported upon the supplemental actuating device $c$ and so arranged that one arm of each lever bears against a portion of the movable chuck member B, substantially in line with the direction of movement thereof, while the other arm bears against the main actuating member or sleeve $b$ in a direction nearly transverse to the movement thereof.

As herein shown, the short arm $c^3$ of each lever bears against a shoulder $B^3$ on the movable chuck member B, the axial support of the levers being such that the pressure of said arm is substantially in the line of movement of the said member B, while the longer arms $c^4$ bear against an inclined conical surface $b^{10}$, formed in the sleeve $b$, the said arms bearing against said surface in a direction nearly transverse to the movement thereof. It will be seen, therefore, that as the member $b$ is moved to the left the resistance of the movable chuck member B will tend to crowd the arms $c^4$ of the levers into contact with the conical surface $b^{10}$, so that the said levers form a locking connection between the main actuator $b$, the supplemental actuator $c$, and the movable chuck member B, which is thus moved in a direction to close the chuck-jaws. As soon, however, as the closure of the said jaws is resisted by the article between them the device $b$ will act as a wedge upon the lever-arms $c^4$, crowding them together and permitting the independent movement of the said device $b$ with relation to the device $c$. If at the time such movement takes place the device $c$ is stationary with relation to the chuck member A, it is obvious that the crowding together of the lever-arms $c^4$ will produce a movement of the levers on their fulcrums, the arms $c^3$ engaging the shoulder $B^3$, thus permitting a slight but powerful movement thereof with relation to the member A, which firmly closes the chuck-jaws, which are then locked by the engagement of the arms $c^4$ with the surface $b^{10}$.

To prevent the lever-arms $c^4$ from slipping along the surface $b^{10}$, the said surface is provided at intervals with notches $b^{12}$ to receive projections $c^5$ at the ends of the arms $c^4$, so that it is impossible for the chuck-jaws to loosen or open unless the device $b$ is moved by another agency.

The device $c$ is arranged to be locked to the stationary chuck member A at the end of a predetermined movement, the parts being so adjusted that such movement will practically close the chuck-jaws, but not sufficiently to hold the work. As herein shown, the locking means consist of one or more pins $c^6$, supported in tubular guides $c^7$, Figs. 1 and 5, formed in a flange $c^8$, Fig. 6, upon the sleeve $c$, the said pins being arranged to engage a notch or channel $A^3$ in the member A after the member $c$ has been moved a predetermined distance. The said pins are adapted to be moved into the said notch by the independent movement of the sleeve $b$, which takes place when the chuck is practically closed, the said sleeve having an inclined surface $b^{13}$, adapted to act upon an inclined surface $c^9$, formed on the said pins, the said surface sliding the pins into place when the member $b$ moves past the member $c$. In closing the chuck, therefore, the handle $b^4$ is thrown to the left, Fig. 1, the main and supplemental actuating devices $b$ and $c$, respectively, and the movable chuck member B traveling together until the closure of the chuck-jaws is resisted by contact with the article in the chuck. The frictional contact of the lever-arms $c^4$ with the conical surface $b^{10}$ is then overcome by a continued movement of the actuator, the sleeve $b$ being moved with relation to the sleeve $c$ to the position shown in Fig. 5, causing the pins $c^6$ to engage the notch or channel $A^3$, thus locking the member $c$ stationary with relation to the member A. The parts are then locked together, so as to resist any tendency of the chuck-jaws to open, it being obvious that the more the jaws tend to open the more firmly the arms $c^4$ will be crowded against the member $b$. If, however, the article (being possibly somewhat smaller than the average for which the chuck is adjusted) is not firmly held, a further movement of the sleeve $b$ will rock the levers $c^2$ upon their pivots, the arms $c^3$ thus bearing against the shoulder $B^3$, causing a slight but powerful movement of the chuck member B to firmly clamp the article in the chuck.

Since the outer sleeve is the primary actuating member, it is obvious that as soon as the closure of the chuck-jaws is resisted the inclined surfaces $b^{13}$ will begin to crowd the pins $c^6$ inward, so that as soon as they reach the channel $A^3$ they will at once enter the said channel, and thereby lock the secondary or supplemental actuating member. Furthermore, even if the article is so small as not to materially resist the closure of the jaws at the time when the pins reach the channel the mere frictional resistance or drag of the movable chuck member will tend to keep a continual pressure on the pins, so that they will enter the channel as soon as they reach it. The preliminary adjustment, therefore, is so made as to leave a certain amount of lost motion to be taken up by the compensating device, so that the insertion in the chuck of the largest article of any set of articles for which the chuck has been adjusted will not prevent the supplemental actuating member from moving far enough to bring the locking-pins into alinement with the locking-channel.

To adjust the initial position of the chuck member B with relation to its actuating means, the position of the shoulder $B^3$ is made variable, the said shoulder being shown in Fig. 6 as formed on a member $B^4$, screw-threaded upon the end of the member B, so that by turning the same the position of the said shoulder may be varied, there being a lock-nut $B^5$ to maintain the adjustment when once effected.

In order to unlock the chuck, it is necessary that the pins $c^6$ should be withdrawn from the notch or channel $A^3$, and this is accomplished in response to the movement of the main actuating device $b$ in the direction opposite to that which has produced the closing of the chuck. As herein shown, the said member $b$ is provided with inclined projections $b^{14}$, adapted to project into openings $c^{10}$ in the flange $c^8$ and to engage inclined surfaces $c^{12}$, formed in openings through the pins $c^6$, so that the longitudinal movement of the said member will lift the pins and free the sleeve $c$. The several parts will then travel together in such a direction as to open the chuck.

To prevent independent rotation of the sleeves $b$ and $c$, the said sleeve $c$ is shown as provided with a longitudinal slot $c^{13}$, (see dotted lines, Fig. 5, and full lines, Fig. 6,) into which projects a screw or similar projection $b^{15}$ from the sleeve $b$. The said slot and pin prevent independent rotation of said parts and also lock them together as far as actual longitudinal displacement is concerned, although providing means for such independent longitudinal movement as is necessary in the operation of the device.

All of the devices thus far described are arranged to rotate with the lathe shaft or member A, except the actuating-yoke $b^3$, so that the chuck can be operated regardless of the position in which the lathe-shaft may be, the actuating device always remaining stationary with relation to the frame, except for its actuating movement.

The jaws $d$, to which are detachably secured the engaging blocks $d^2$, which are properly shaped to fit the articles to be operated upon, are rotatably mounted in bearings in the chuck members or slides C, said bearings being shown as provided with antifriction devices or balls $d^3$. The said jaws in accordance with the invention are arranged to be rotated without stopping the lathe, and for this purpose are provided with an operating device rotatable with the lathe-shaft, which in turn is provided with an actuating device stationary with relation thereto, so far as relates to rotary movement, so that it can be operated while the lathe is in motion. As herein shown, the jaws are arranged to be rotated through the agency of a pawl $e$, Fig. 3, adapted to engage ratchet teeth or notches $d^4$, formed on the periphery of one of the jaws. The said pawl is pivotally connected at $e^2$ upon an oscillating supporting member $e^3$, which surrounds one of the jaws, the pawl being pressed toward the periphery of said jaw by means of a spring $e^4$. It is obvious, therefore, that an oscillating movement of the said member $e^3$ around the said jaw will produce a step-by-step rotary feed movement of the said jaw, so as to rotate the same with relation to the chuck members, both jaws traveling together, since they are connected by the casting in the chuck. To prevent any possibility of twisting, the said jaws are shown as positively connected together by pins $d^5$, having a sliding fit in one or both engaging blocks $d^2$. One of the jaws is provided with a stop $d^6$, shown as a depending arm pivoted at $d^7$ in the jaw-carrier C and adapted to enter notches $d^8$, formed in the periphery of the jaw below the ratchet-notches $d^4$, the said stop being provided with a spring $d^9$, which causes it to enter one of the said notches when the same is in line with the end of the stop. The said notches are equal in number to the ratchet-notches, and the stop is arranged to operate each time the feed movement takes place, so that the jaw will be stopped in the proper position and locked pending the succeeding movement. To permit the feed movement of the jaw, the said stop is arranged to be unlocked in response to the inoperative movement of the member $e^3$, the said member being shown as provided with an inclined or cam surface $e^5$, which acts upon the said stop to throw it out of the notch $d^8$ prior to the forward or feed movement. The jaws are commonly rotated a quarter-turn or a half-turn in most kinds of work; but for convenience the jaw is shown as provided with eight of the ratchet-notches, the member $e^3$ being oscillated twice for each quarter-turn of the jaw, since it is desirable to make the throw of the actuating device as short as possible.

To oscillate the member $e^3$, the same is shown as connected by means of a link $f$ with a sleeve $f^2$, which is surrounded by a collar $g$, adapted to be connected with an actuating-lever $h$. As herein shown, the said lever $h$ is in the form of a band surrounding the lathe-shaft and pivoted at $h^2$ below the same, the opposite sides of the said band being slotted, as indicated at $h^3$, to receive projections $g^2$ from the collar $g$, so that the sleeve $f^2$ can be moved longitudinally with relation to the lathe-shaft, while the actuator for the said sleeve remains stationary except for the swinging movement thereof, which produces such longitudinal movement of the sleeve. When the chuck-jaws are opened or closed to insert or remove the work, the sleeve $f^2$ will simply travel forward or backward along the lathe-shaft, the frictional resistance of the pawl being sufficient to prevent any operation of the member $e^3$ in response to such movement of the chuck members. When once the chuck members are locked, however, it is obvious that any movement of the sleeve $f^2$ will be transmitted without lost motion to the member $e^3$, so that by moving the handle of the lever $h$ back and forth the operator can rotate the chuck-jaws without stopping the lathe. To limit the forward rotary movement of the chuck-jaws, the member $e^3$ is shown as provided with a shoulder $e^6$, adapted to come in contact with a fixed portion of the chuck-frame, so that there is no danger of overthrowing in case the stop $d^6$ should fail to operate properly. The link $f$ is shown as pivotally connected at $f^3$ with the sleeve $f^2$ and has a loose pivotal connection at $f^4$ with the member $e^3$, the lateral as well as longitudinal movement of the chuck-jaws as they are opened and closed being thus provided for.

Figure 9:
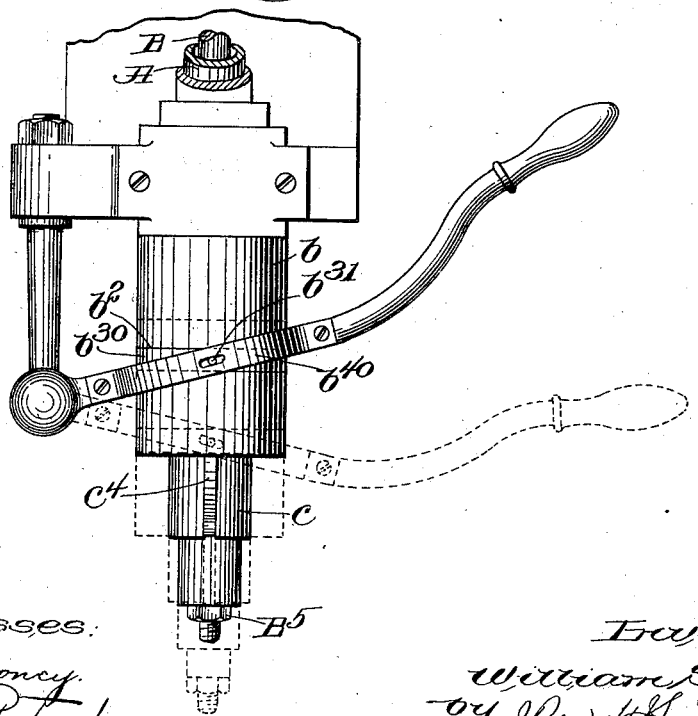

To obtain the power necessary to clamp the article in the chuck with a single movement, it is desirable to use a lever as an actuating device; but it is obvious that any suitable or usual connecting mechanism may be used to transmit the lever movement to the chuck-operating sleeve $b$, the geared slide $b^5$ being merely one convenient way of connecting the said member $b$ and the lever $b^4$ to compensate for the difference in direction of movement of said parts. As shown in Figs. 8 and 9, the said lever may be arranged horizontally instead of vertically and provided with a band $b^{40}$, surrounding the sleeve $b$, which is provided with a collar $b^{30}$ in the channel $b^2$, the said collar having projections $b^{31}$ to enter slots in the band $b^{40}$. This construction may in some instances be more convenient where a horizontal handle can be used to better advantage than a vertical one.

It is not intended to limit the invention to the specific construction and arrangement of the various parts herein shown and described to illustrate the same, since modifications may obviously be made without departing from the invention.

I claim—

1. The combination with the chuck members one of which is movable with relation to the other; of a main actuating device for the movable chuck member; and a supplemental actuating device adapted to be locked to the stationary chuck member at the end of a predetermined movement, said actuating devices together constituting variable locking means for connecting the supplemental actuating device with the movable chuck member after it has been locked to the stationary chuck member.

2. The combination with chuck members one of which is movable with relation to the other; of a main actuating device for the movable chuck member; a supplemental actuating device adapted to be locked to the stationary chuck member at the end of a predetermined movement; and means whereby said main and supplemental actuating devices and the movable chuck member are locked together in response to the pressure of the movable chuck member, substantially as described.

3. The combination with the movable and stationary chuck members; of a main actuating device for the movable chuck member; a supplemental actuating device; means for locking said supplemental actuating device to the stationary chuck member after said supplemental actuating device has been moved a predetermined distance; and compensating devices so arranged between said main and supplemental actuating devices and the movable chuck member that said parts are locked together in any of a number of predetermined relative positions in response to the pressure of the movable chuck member, but are capable of being unlocked in response to a movement of the main actuating member, as set forth.

4. The combination with the stationary and movable chuck members; of a main actuating device for the movable chuck member; a supplemental actuating device; said actuating devices constituting variable locking means for locking one chuck member to the other in any of a number of predetermined relative positions according to the pressure exerted by the movable chuck member; and means independent of said actuating devices for adjusting the position of said movable chuck member with relation to the actuating device, as set forth.

5. The combination with the fixed and movable chuck members; of a main actuating device; a supplemental actuating device; one or more levers pivotally connected with said supplemental actuating device, the shorter arms of said levers engaging the movable chuck member and the longer arms of said levers engaging an inclined surface formed on said main actuating device whereby pressure upon the movable chuck member tends to force said levers into engagement with said inclined surface; retaining-notches for said levers formed on said inclined surface; and means for locking said supplemental actuating device to the stationary chuck member, as set forth.

6. The combination with the fixed and movable chuck members; of a main actuating device; a supplemental actuating device; one or more levers pivotally connected with said supplemental actuating device, one arm of the lever bearing against the movable chuck member substantially in line with the direction of movement thereof, and the other arm bearing against the main actuating member in a direction nearly transverse to the direction of movement thereof; and means for locking said supplemental actuating member to the fixed chuck member, as set forth.

7. The combination with the fixed and movable chuck members; of main and supplemental actuating devices for the movable member, the said actuating devices being capable of movement relative to each other; means for locking said supplemental actuating device to the stationary chuck member; and means for unlocking said supplemental actuating device in response to the relative movement aforesaid, as set forth.

8. The combination with the chuck members, one of which is movable with relation to the other; of main and supplemental actuating devices for closing the chuck; means for locking one of said actuating devices to one of the chuck members; and compensating devices for also locking said actuating devices to the other chuck member, the final locking position being determined by the relation between the resistance at the chuck-jaws and the pressure exerted upon the other actuating device.

9. The combination with the fixed and movable chuck members; of actuating mechanism for the movable chuck member comprising an outer sleeve provided with an operating-lever, said sleeve having an inclined inner surface; an inner sleeve, both of said sleeves surrounding the stationary chuck member and being longitudinally movable with relation thereto; a lever pivotally connected with said inner sleeve and bearing at one side of the fulcrum against the movable chuck member and at the other side of the fulcrum against the inclined inner surface of the other sleeve; and means for locking the inner sleeve to the stationary chuck member, as set forth.

10. In a chuck, the combination with a main actuator for the movable chuck member provided with an inclined surface having retaining-notches formed thereon; of a supplemental actuator provided with levers pivotally supported thereon and bearing at one end against said inclined surface and at the other end against a portion of the movable chuck member, said levers being so arranged that the wedging action of the inclined surface upon the levers will produce a movement of the movable chuck member relative to the supplemental actuator; and means for locking the supplemental actuator to the stationary chuck member, said locking means being operated by the main actuator, as set forth.

11. The combination with the movable chuck members; of a main actuator therefor provided with an operating device; a stationary chuck member; a supplemental actuator adapted to be locked to said stationary chuck member at the end of a predetermined movement of said supplemental actuator; and compensating levers arranged to coöperate with said actuators and said movable chuck member to lock the latter in variable positions relative to the stationary chuck member after the supplemental actuator has been locked to the stationary chuck member, as set forth.

12. The combination with chuck members mounted on a rotating shaft; of jaws rotatable with relation to said members; and means for rotating said jaws while the shaft is in motion, as set forth.

13. The combination with revolving chuck members; of chuck-jaws rotatable with relation thereto; and a non-rotatable actuating device for said jaws, as set forth.

14. The combination with revolving chuck members; of chuck-jaws rotatable with relation thereto; means for rotating said jaws by a step-by-step movement; and a non-rotatable actuator for said rotating means, as set forth.

15. In a chuck, the combination with revolving chuck members; of chuck-jaws rotatably connected with said members; a pawl carried by said revolving chuck members and adapted to coöperate with ratchet-teeth formed in one of said jaws; and a non-rotatable actuating device for operating the said pawl, substantially as described.

16. The combination with a rotatable chuck-jaw provided with ratchet-teeth; of a pawl-carrier rotatable therewith; a sleeve longitudinally movable with relation to the chuck and connected with said pawl-carrier to produce a reciprocating movement thereof; a non-rotatable collar to produce the longitudinal movement of said sleeve; and a lever coöperating with said collar, as set forth.

17. In a revolving chuck, the combination with a rotatable chuck-jaw provided with ratchet-teeth; of a pawl to coöperate with said teeth in producing the rotation of said jaw; a pawl-carrier surrounding said jaw and supported in the revolving chuck; a non-rotatable actuating device for said pawl-carrier; and a locking-stop coöperating with the jaw at the end of each operating movement of said pawl-carrier, as set forth.

18. The combination with a rotatable chuck-jaw; of a step-by-step rotating device therefor comprising a pawl carried by a reciprocating operating device; means for limiting the forward movement of said operating device; a locking-stop arranged to coöperate with the jaw at the end of each forward movement of said operating device; and means for unlocking the said stop in response to the rearward movement of said operating device, as set forth.

19. The combination with a revolving chuck member; of a chuck-jaw rotatable with relation to said member; a reciprocating operating device for said jaw connected with a sleeve longitudinally movable with relation to said chuck member but traveling therewith in its revolving movement, said sleeve being provided with an annular channel; a non-rotatable collar in said channel; and a lever having a stationary pivotal support and connected with said collar, as set forth.

In testimony whereof I have signed my name to this specification in the presence of two subscribing witnesses.

WILLIAM SCOTT.

Witnesses:
HENRY J. LIVERMORE,
JAS. J. MALONEY.